(12) United States Patent
Żak et al.

(10) Patent No.: US 12,048,889 B2
(45) Date of Patent: Jul. 30, 2024

(54) FILTER ASSEMBLY FOR A SERVOVALVE

(71) Applicant: Hamilton Sundstrand Corporation, Charlotte, NC (US)

(72) Inventors: Maciej Żak, Wrocław (PL); Zuzanna Jamroz, Wrocław (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 19 days.

(21) Appl. No.: 17/239,824

(22) Filed: Apr. 26, 2021

(65) Prior Publication Data

US 2021/0331102 A1    Oct. 28, 2021

(30) Foreign Application Priority Data

Apr. 28, 2020 (PL) .......................................... 433679

(51) Int. Cl.
*B01D 35/30* (2006.01)

(52) U.S. Cl.
CPC ........ *B01D 35/30* (2013.01); *B01D 2201/291* (2013.01); *B01D 2201/301* (2013.01)

(58) Field of Classification Search
CPC .............. B01D 35/30; B01D 2201/291; B01D 2201/301; F15B 2211/615; F15B 21/041; F15B 13/0438
USPC .... 210/348, 455, 457, 171, 435, 450, 493.2, 210/437, 282
See application file for complete search history.

(56) References Cited

U.S. PATENT DOCUMENTS

| | | | |
|---|---|---|---|
| 2,832,318 A | | 4/1958 | Paine |
| 3,024,810 A | * | 3/1962 | Barlow ............... F15B 13/0438 137/625.62 |
| 3,033,783 A | | 5/1962 | Lubben |
| 3,262,563 A | * | 7/1966 | Pall ...................... B01D 35/147 210/90 |
| 3,410,308 A | | 11/1968 | Moog, Jr. et al. |
| 4,521,309 A | * | 6/1985 | Pall ...................... B01D 29/111 210/493.2 |
| 4,922,964 A | * | 5/1990 | Buscher .............. F15B 13/0438 137/625.61 |
| 5,806,565 A | | 9/1998 | Kadlicko |
| 6,595,371 B1 | * | 7/2003 | Desmarais ............. B01D 27/08 210/450 |

(Continued)

FOREIGN PATENT DOCUMENTS

EP          0119752 A1    9/1984
GB           957725 A     5/1964

(Continued)

OTHER PUBLICATIONS

KR 100966016B1 Abstract.

(Continued)

*Primary Examiner* — Madeline Gonzalez
(74) *Attorney, Agent, or Firm* — CANTOR COLBURN LLP (57) ABSTRACT

A filter assembly for a servo valve. The filter assembly has a filter body defining a chamber; a first end cap having a first fluid outlet at a first end of the filter body and a second end cap having a second fluid outlet at a second end of the filter body. A flow restrictor restricts fluid flow between the filter body and each of the first and second fluid outlets. A spacer in the chamber spaces the first end cap from the second end cap.

17 Claims, 4 Drawing Sheets

(56) References Cited

U.S. PATENT DOCUMENTS

| | | |
|---|---|---|
| 6,877,612 B2 | 4/2005 | Wells et al. |
| 9,599,077 B2 | 3/2017 | Jensen |
| 2013/0248464 A1 | 9/2013 | Schweitzer |
| 2019/0118315 A1 | 4/2019 | Kozlowski et al. |

FOREIGN PATENT DOCUMENTS

| | | |
|---|---|---|
| GB | 1147204 A | 4/1969 |
| KR | 100966016 B1 | 6/2010 |
| WO | 2004080568 A1 | 9/2004 |

OTHER PUBLICATIONS

Extended European Search Report for International Application No. 21170308.7 dated Sep. 22, 2021, 8 pages.
European Office Action for EP Application No. 21170308.7, dated Oct. 9, 2023, pp. 1-5.

* cited by examiner

FILTER ASSEMBLY FOR A SERVOVALVE

FOREIGN PRIORITY

This application claims priority to Polish Application No. P.433679 filed Apr. 28, 2020, the entire contents of which is incorporated herein by reference.

TECHNICAL FIELD

The following description relates to a filter assembly for a servo valve. The following description also relates to a servo valve comprising a filter assembly, and more specifically a two-stage servo valve comprising a filter assembly for a first stage.

BACKGROUND

Servo valves are known and are typically used to control how much fluid is ported to an actuator. Servo valves are generally used when accurate position control is required, such as, for example, control of a primary flight surface. Servo valves can be used to control hydraulic actuators or hydraulic motors. They are common in industries which include, but are not limited to, automotive systems, aircraft and the space industry.

Servo valves are well-known in the art and can be used to control the flow and pressure of fluid to an actuator. With a two-stage servo valve, in a first stage typically a flapper is deflected by action of an armature connected to an electric motor away or towards nozzles, which controls the fluid flow through the nozzles. Deflection of the flapper can control the amount of fluid injected from the nozzles, and thus control of a movable spool in a second stage. The second stage acts to control an actuator. In this way, servo valves allow precise control of actuator movement.

During use, contaminants in the fluid passing through the servo valve may cause blockages. Blockages are known to occur in the first stage due to the small gaps between the flapper and the nozzles. Accordingly servo valves are provided with particulate filters to filter contaminants in the fluid passing through the servo valve.

BRIEF DESCRIPTION

According to an aspect of the disclosure, there is provided a filter assembly for a servo valve comprising: a filter body defining a chamber; a first end cap having a first fluid outlet at a first end of the filter body; a second end cap having a second fluid outlet at a second end of the filter body; a flow restrictor configured to restrict fluid flow between the filter body and each of the first and second fluid outlets; and a spacer in the chamber spacing the first end cap from the second end cap.

In accordance with additional or alternative embodiments, the spacer supports the filter body at the first and second ends of the filter body.

In accordance with additional or alternative embodiments, the first end cap is received over the first end of the filter body. In accordance with additional or alternative embodiments, the second end cap is received over the second end of the filter body.

In accordance with additional or alternative embodiments, the first end cap and the second end cap are press fitted on the filter body.

In accordance with additional or alternative embodiments, the first end of the filter body is retained between the spacer and the first end cap. In accordance with additional or alternative embodiments, the second end of the filter body is retained between the spacer and the second end cap.

In accordance with additional or alternative embodiments, the spacer comprises a first head and a second head, and a shaft extending between the first and second heads.

In accordance with additional or alternative embodiments, the spacer defines an inner cavity fluidly communicating with the fluid nozzle and comprises at least one fluid opening between an outer side of the spacer and the inner cavity.

In accordance with additional or alternative embodiments, the flow area of the at least one fluid opening is greater than or equal to the flow area of at least one of the bore and the fluid nozzle.

In accordance with additional or alternative embodiments, the flow restrictor comprises a first nozzle fluidly communicating with the first fluid outlet, and a second nozzle fluidly communicating with the second fluid outlet.

In accordance with additional or alternative embodiments, the first end cap comprises the first fluid nozzle and the second end cap comprises the second end cap. In accordance with additional or alternative embodiments, the first fluid nozzle forms the first fluid outlet and the second fluid nozzle forms the second fluid outlet.

In accordance with additional or alternative embodiments, the first fluid nozzle is an aperture in the first end cap. In accordance with additional or alternative embodiments, the second fluid nozzle is an aperture in the second end cap.

In accordance with additional or alternative embodiments, the spacer forms the restrictor.

In accordance with additional or alternative embodiments, at least a portion of the spacer is spaced from the filter body to define an outer cavity between the outer side of the spacer and the filter body.

In accordance with additional or alternative embodiments, the inner cavity is a bore.

In accordance with additional or alternative embodiments, the support, first and second end caps, and the filter body are formed from materials having substantially the same coefficient of thermal expansion. In accordance with additional or alternative embodiments, the support, first and second end caps, and the filter body are formed from the same material.

In accordance with additional or alternative embodiments, the filter body is a tubular filter body.

In accordance with additional or alternative embodiments, the filter body comprises an array of holes formed through a wall of the filter body.

In accordance with additional or alternative embodiments, the array of holes are laser drilled holes.

According to an aspect, there is provided a servo valve comprising: a fluid supply; a first stage of the servo valve; a second stage of the servo valve; and a filter assembly as recited above; wherein the filter assembly filters fluid from the fluid supply to the first stage of the servo valve.

In accordance with additional or alternative embodiments, the servo valve comprises a filter assembly chamber, wherein fluid from the fluid supply to the second stage of the servo valve flows in the filter assembly chamber.

According to an aspect, there is provided a method of forming a filter assembly for a servo valve comprising: providing a filter body defining a chamber; disposing a spacer in the chamber; fitting a first end cap having a first fluid outlet at a first end of the filter body; fitting a second end cap having a first fluid outlet at a second end of the filter body; and spacing the first end cap from the second end cap with the spacer.

According to an aspect, there is provided a filter cartridge for a servo valve comprising: a filter body; a flow restrictor comprising a first nozzle at a first end of the filter body and a second nozzle at a second end of the filter body; and a support spacing the first nozzle from the second nozzle.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

Figure 1:
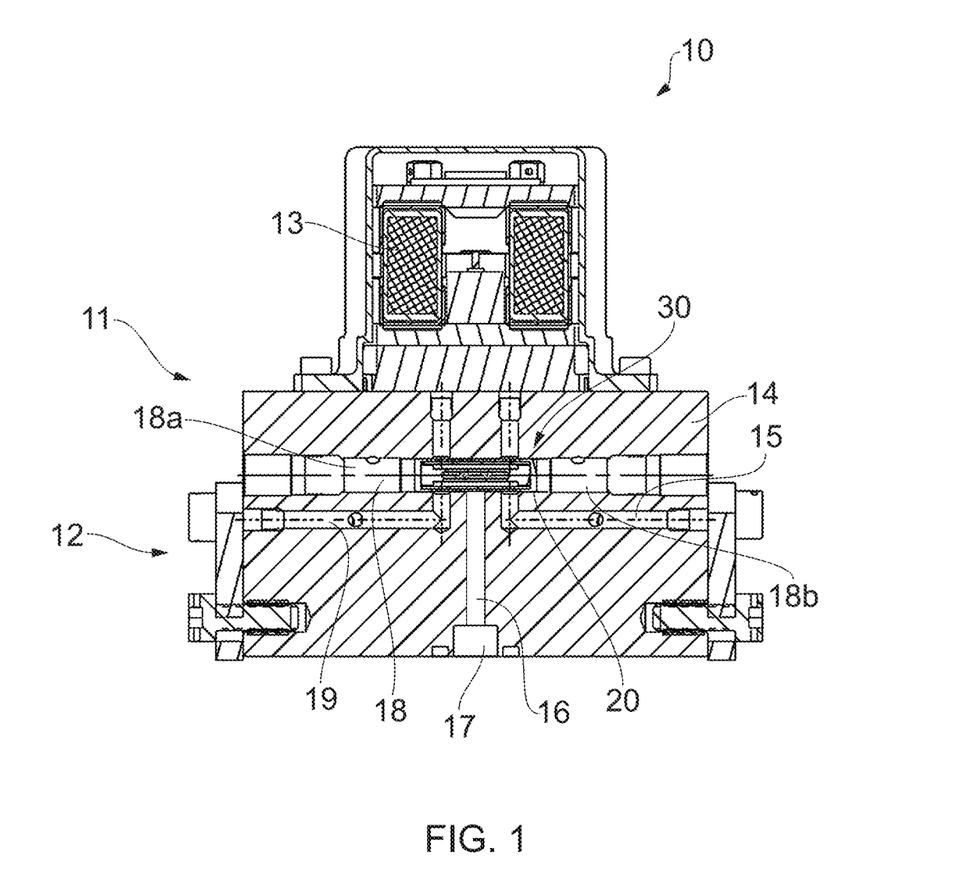
FIG. 1 is a cross sectional view of a servo valve with a filter assembly.

With reference to FIG. 1, a servo valve 10 is described below. The servo valve is a two-stage servo valve comprising a first stage 11 and a second stage 12. The servo valve 10 comprises an electric motor 13, typically a torque motor. The electric motor 13 and the second stage 12 are disposed on either side of the first stage 11. The first and second stages 11, 12 of the servo valve 10 are in a housing 14.

The electric motor 13 comprises permanent magnets, coils, and an armature (not shown). The coils electrically communicate with an electrical supply (not shown) and, when activated, interact with the permanent magnets to create movement of the armature.

The servo valve has a fluid flow system 15. This provides for the flow of a working fluid, such as a hydraulic fluid, for operating the servo valve 10. Hydraulic fluid is, for example, fuel or oil. The fluid flow system 15 includes a fluid supply 16. Fluid supply 16 includes an inlet fluid port 17. The fluid supply 16 is a common fluid supply to both the first stage 11 and the second stage 12.

The first stage 11 of the servo valve comprises a flapper (not shown) which is actuated by the electric motor 13. The armature of the electric motor 13 causes the flapper to be deflected. The first stage 11 comprises two axially aligned, opposed first stage nozzles (not shown). The first stage nozzles are housed within a nozzle chamber and comprise fluid outlets which are spaced apart from each other. Working fluid is received at the first stage nozzles. The flapper is received between the fluid outlets of the first stage nozzles. A blocking feature (not shown) at an end of the flapper interacts with the fluid outlets of the first stage nozzles to alternately block the nozzles and provide metering of fluid from the fluid outlets. Blockage of each fluid outlet of the first stage nozzles causes a pressure differential between different sides of the first stage 11 of the servo valve 10 which is provided to the second stage 12 at corresponding control ports to control operation of the second stage 12.

The second stage 12 of the servo valve 10 comprises a movable spool (not shown). The spool is part of a spool assembly which has supply ports providing high pressure fluid from the fluid supply 16, the control ports provided with the fluid from the first stage and a return port.

The fluid supply 16 provides fluid to a first stage fluid system 18 and a second stage fluid system 19. The required fluid pressure to be provided at the first stage fluid system 18 is lower than the required fluid pressure to be provided at the second stage fluid system 19. As such, a flow restrictor 20 is provided between the fluid supply 16 and the first stage fluid system 18. The flow restrictor 20 provides a flow restriction to achieve a reduction in fluid pressure between the fluid supply 16 and the first stage fluid system 18. The first stage fluid system 18 includes a first side 18a and a second side 18b. The first and second sides 18a, 18b communicate with respective first stage nozzles (not shown). The fluid flow system 15 includes a filter assembly 30. The filter assembly 30 is disposed in the fluid flow system 15 between the fluid supply 16 and the first stage fluid system 18.

Figure 2:
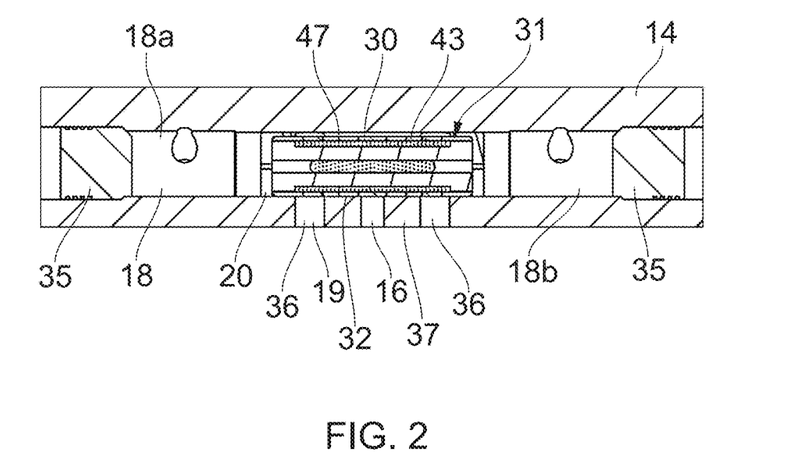
FIG. 2 is a cross sectional view of part of the servo valve of FIG. 1 showing the filter assembly.

Referring now to FIG. 2, a cross sectional view of part of the servo valve 10 is shown. The filter assembly 30 is shown disposed in a filter assembly chamber 31.

The filter assembly 30 filters the working fluid provided to the first stage fluid system 18 from the fluid supply 16. By providing the filter assembly 30 it is possible to restrict contaminants from entering the first stage 11, and for example, restrict contaminants from reaching the first stage nozzles and the flapper of the first stage 11. As such, reliability of the servo valve 10 may be maximized. Maintenance of the servo valve 10 may be minimized.

The housing 14 of the servo valve 10 includes the filter assembly chamber 31. The filter assembly 30 is removably received in the filter assembly chamber 31. The filter assembly 30 is press fitted in the filter assembly chamber 31, although other retention arrangements are envisaged. The filter assembly 30 is a cartridge 32. The cartridge 32 is interchangeable in the servo valve 10. As such, the cartridge 32 of the filter assembly 30 is replaceable during a maintenance procedure.

The filter assembly 30 comprises the flow restrictor 20 and a filter 33. The filter 33 acts to filter contaminants in the working fluid from the fluid supply 16. The filter 33 is upstream of the flow restrictor 20.

The filter assembly chamber 31 is formed by the housing 14. The filter assembly chamber 31 is accessible in the housing 14 by the removal of a plug 35. The filter assembly 30 is removable from the filter assembly chamber 31 and may be replaced by a replacement filter assembly.

The filter assembly chamber 31 fluidly communicates with the first stage first side 18a at one end and fluidly communicates with the first stage second side 18b at another end. As such, the filter assembly chamber 31 is between the first stage first side 18a and the first stage second side 18b. The filter assembly chamber 31 is in fluid communication with the fluid supply 16. Working fluid provided from the fluid supply 16 under pressure is able to flow into the filter assembly chamber 31.

The filter assembly chamber 31 is in fluid communication with the second stage fluid system 19. The second stage fluid system 19 has first and second inlet ports 36, which communicate with the filter assembly chamber 31. The fluid supply 16 and the second stage inlet ports 36 fluidly communicate with the filter assembly chamber 31 through a filter assembly chamber wall 37. The filter assembly 30 forms a fluid seal with the fluid assembly chamber wall 37 to separate the fluid supply 16 from the first stage first side 18a and the first stage second side 18b. The fluid seal formed between the filter assembly 30 and the filter assembly chamber wall 37 separates the second stage inlet ports 36 from the first stage first side 18a and the first stage second side 18b.

Figure 3:
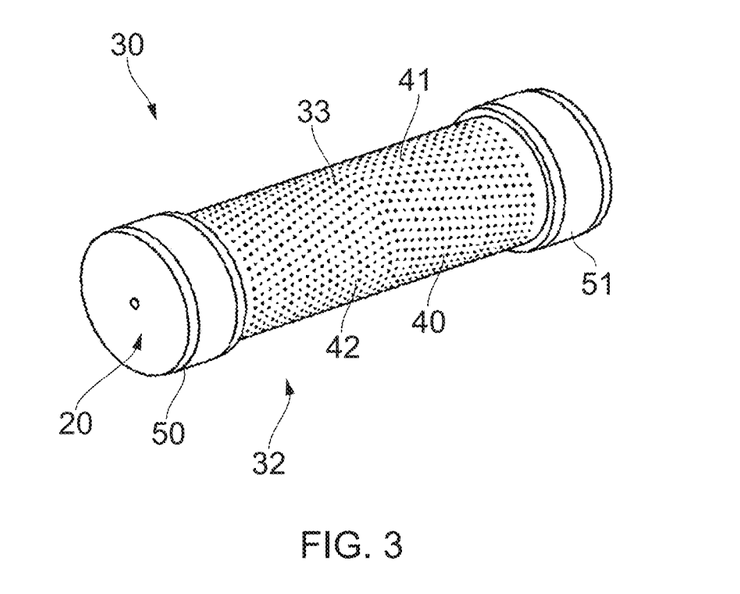
FIG. 3 is a perspective view of the filter assembly shown in FIG. 2.
Figure 4:
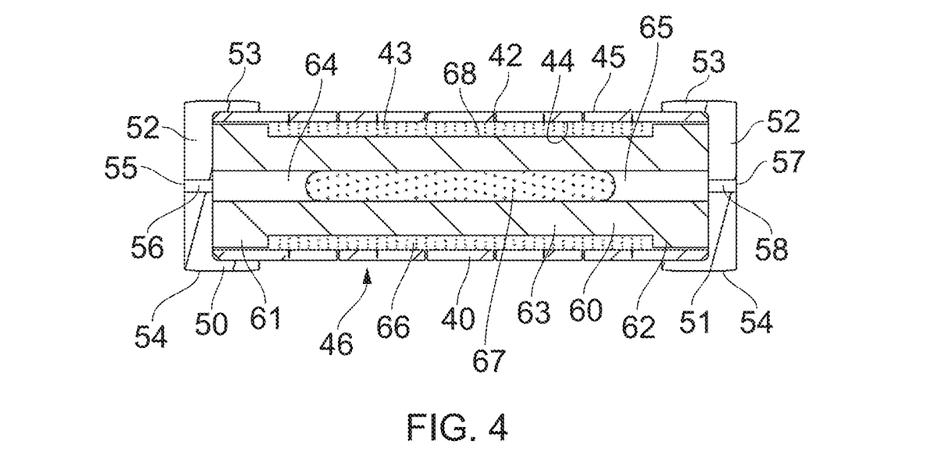
FIG. 4 is a cross sectional view of the filter assembly of FIG. 3.

Referring now to FIGS. 3 and 4, the filter assembly 30 will now be described in detail. The filter assembly 30 comprises a filter body 40. The filter assembly 30 has first and second end caps 50, 51 at first and second ends of the filter body 40. The filter body 40 is tubular and the first and second end caps 50, 51 are received over the ends of the tubular filter body 40. The filter body 40 comprises a filter wall 41. An array of holes 42 are formed through the filter wall 41. The filter wall 41 is formed as a perforated sheet. The array of holes 42 are formed by laser drilling. Other formation means are envisaged, for example photo-etching.

The filter body 40 defines a chamber 43. The filter wall 41 has an inner side 44 and an outer side 45. The array of holes 42 communicates between the inner side 44 and the outer side 45. The array of holes 42 form a filtration mesh to act as the filter 33. The extent of the array of holes 42 is spaced from the ends of the filter body 40 in the embodiment shown in FIGS. 3 and 4. It will be understood that the arrangement spacing and size of the holes 42 may vary depending on the requirements of the servo valve 10. In the present arrangement the filter wall 41 has a wall thickness of about 0.25 mm.

Figure 5:
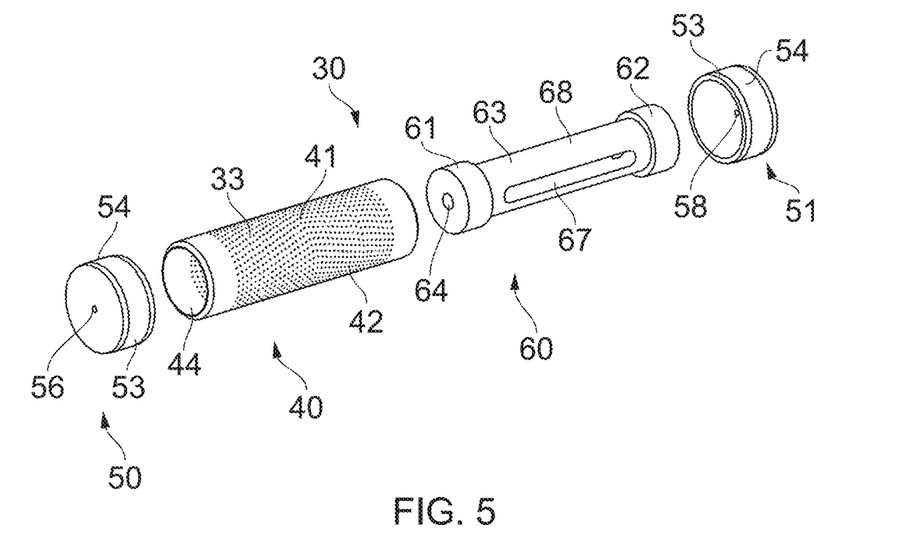
FIG. 5 is an exploded view of the filter assembly shown in FIG. 3.

The first and second end caps 50, 51 are fitted over the ends of the filter body 40. The first and second end caps 50, 51 are press fitted over the ends of the filter body 40. Referring to FIGS. 3 to 5, the end caps 50, 51 comprise a base 52 with an upstanding flange 53. The upstanding flange 53 acts as a circumferential wall. The upstanding flange 53 overlaps the outer side 45 of the end of the filter body 40. The end caps 50, 51 each have a peripheral face 54. The peripheral face 54 is configured to correspond with an inner surface of the filter assembly chamber wall 37. The peripheral face of each end cap 50, 51 is configured to fluidly seal with the filter assembly chamber wall 37. The peripheral face 54 of each end cap 50, 51 has a diameter corresponding to the diameter of the inner surface of the filter assembly chamber wall 37. The diameter of the peripheral face 54 of each end cap 50, 51 is greater than the diameter of the outer side 45 of the filter body 40. A peripheral recess 46 is formed between the end caps 50, 51 by the stepped section formed by the filter body 40. When the filter assembly 30 is received in the filter assembly chamber 31, the peripheral recess 46 forms a peripheral cavity 47. The peripheral cavity 47 is defined between the end caps 50, 51, the filter assembly chamber wall 37, and the outer side 45 of the filter body 40. The peripheral cavity 47 forms a circumferentially extending space around the filter body 40 in the housing 14. As such, fluid supplied to the filter assembly chamber 31 is able to flow around the circumference of the filter body 40.

The first end cap 50 has a first fluid outlet 55. The first fluid outlet 55 communicates with the first stage first side 18a when the filter assembly 30 is in the filter assembly chamber 31. The first fluid outlet 55 is formed by a fluid nozzle 56. The first fluid nozzle 56 is in the end cap 50. The first fluid nozzle 56 is formed by an aperture through the base 52 of the end cap 50. The fluid nozzle 56 communicates between the chamber 43 and external to the filter assembly 30.

The second end cap 51 has a second fluid outlet 57. The second fluid outlet 57 is formed by a second fluid nozzle 58. The second fluid nozzle 58 is formed in the base 52 of the second end cap 51. The first and second fluid nozzles 56, 58 form the flow restrictor 20. The first and second end caps 50, 51 form the flow restrictor 20. The first and second fluid nozzles 56, 58 are formed by apertures having a predetermined diameter. The diameter is determined by the desired pressure reduction across the flow restrictor 20. The fluid nozzles 56, 58 act to restrict flow to each of the first and second sides 18a 18b of the first stage 18. In such an embodiment, the flow restrictor 20 acts to cause a pressure reduction across the filter assembly 30. The fluid nozzles 56, 58 are constant nozzles.

The first and second end caps 50, 51 are press fitted on the filter body 40. The filter assembly 30 comprises a spacer 60. The spacer 60 is received in the chamber 43 of the filter body 40. The spacer 60 acts to space the first end cap 50 from the second end cap 51. The spacer 60 is an elongate member. The spacer 60 has a length corresponding to the length of the filter body 40. When the spacer 60 is received in the filter body 40 and the end caps 50, 51 are received on the ends of the filter body 40, the spacer 60 acts to limit the extent to which the first and second end caps 50, 51 may be brought together and so limits the load that can be applied on the filter body 40 with such a configuration.

The spacer 60 comprises a first head 61 at one end and a second head 62 at a distal end to the first head 61. The first and second heads 61, 62 define the ends of the spacer 60. A shaft portion 63 extends between the first and second heads 61, 62. The first and second heads 61, 62 have a greater diameter than the shaft portion 63. A recess is therefore formed between the first and second heads 61, 62. The diameter of the heads 61, 62 corresponds to the diameter of the inner side 44 of the filter body 40. The filter body 40 is slide fitted over the spacer 60.

A bore 64 is formed through the spacer 60. The bore 64 extends along the longitudinal length of the spacer 60. The bore 64 is open at each end of the spacer 60. The diameter of the bore 64 is greater than the diameter of each fluid nozzle 56, 58. The bore 64 is therefore prevented from acting as a flow restrictor in such an embodiment. The bore 64 acts as an inner cavity 65 in the filter body 40. When the spacer 60 is received by the filter body 40, an outer cavity 66 is defined between an outer face 68 of the shaft 63 and the inner side 44 of the filter body 40. The outer cavity 66 extends circumferentially around the spacer 60. In such an embodiment, the internally exposed area of the filter wall 41 for filtering is maximized. Openings 67 are formed through the spacer between the outer face of the spacer and the bore 64. In the present embodiment the spacer 60 has two openings 67, however, it will be understood that the number of openings and the arrangement of the openings 67 may differ. The openings 67 are elongate and extend in an axial direction of the spacer 60.

The filter body 40, end caps 50, 51, and spacer 60 are formed from the same material. These components are alternatively formed from materials having substantially the same coefficient of thermal expansion. For example, these components may be formed from stainless steel, such as A286. These components are formed so as to minimize differing thermal expansions. Furthermore, the components are formed of material which will have substantially the same coefficient of thermal expansion as the housing 14. Such a configuration helps to prevent leakage and possible damage to the components.

Upon assembly of the filter assembly 30, with reference to FIG. 5, the spacer 60 is received in the filter body 40. The heads 61, 62 locate the spacer 60 in the filter body 40 in a radial direction. The longitudinal length of the spacer 60 substantially corresponds to the longitudinal length of the filter body 40 so as to restrict the load applied on the filter body 40 upon fitting of the end caps 50, 51. The end caps 50, 51 are press fitted over the ends of the filter body 40. The ends of the filter body 40 are held between the heads 61, 62 of the spacer 60 and the circumferential wall 53 of the ends caps 50, 51. The fluid nozzles 56, 58 of the end caps 50, 51 align with the bore 54. The configuration of the filter assembly 30 forms a stable structure which may be easily assembled and enables the wall thickness to be minimized in such an embodiment. The filter assembly 30 is formed as the cartridge 32 which may then be inserted into the housing 14. The filter assembly 30 is press fitted in the filter assembly chamber 31 such that the end caps 50, 51 form a fluid seal with the filter assembly chamber wall 37 around the peripheral edge.

Upon operation of the servo valve 10, working fluid is supplied, for example fuel or oil, to the fluid systems 18, 19 of the first and second stages 11, 12 through the filter assembly chamber 31. Working fluid is fed to the second stage 12 from the fluid supply 16 through the second stage inlet ports 36 fluidly communicating with the filter assembly chamber 31. Working fluid supplied to the second stage inlet ports 36 is able to flow directly to the second stage inlet ports 36 without passing through the filter assembly 30. This portion of the working fluid is able to flow around the periphery of the filter body 40 and so produce a washing effect on the filter 33 to remove contaminants which are filtered by the filter 33. Contaminants filtered by the filter 33 are removed from the filter 33. In such an embodiment, maintenance of the filter 33 may therefore be minimized.

Filtered working fluid passing through the filter 33 flows through the first and second fluid nozzles 56, 58. The fluid nozzles 56, 58 act to restrict flow through the end caps 50, 51 and so cause a pressure reduction across the end caps 50, 51. As such, there is a pressure reduction between the filter side and the first stage first and second sides 18a, 18b. In such an embodiment, filtered working fluid is therefore provided at a reduced pressure to the first stage 11.

Figure 6:
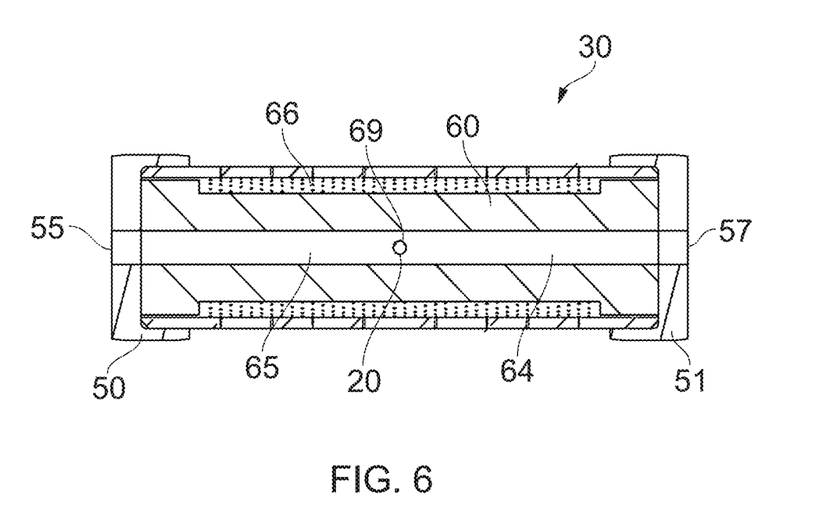
FIG. 6 is a cross sectional view of a different configuration of filter assembly.

Referring now to FIG. 6, an alternative embodiment of the filter assembly 30 will now be described. The filter assembly 30 shown in FIG. 6 is generally the same as the filter assembly described above, having the same general features and functionality. As such, a detailed description of this alternative embodiment will be omitted. However, in this embodiment, the flow restrictor 20 is provided by the spacer 60. In this embodiment, the first fluid outlet 55 and the second fluid outlet 57 are formed by openings through the first and second end caps 50, 51 having a flow area which minimizes or eliminates a flow restriction on the fluid flow through the end caps 50, 51. With this arrangement the spacer is provided with a flow restricting opening 69 extending between the outer side of the spacer 60 and the bore 64. With such an arrangement the flow of fluid to the bore 64 is restricted and so the spacer 60 itself acts as the flow restrictor 20. The opening 69 may be formed as a single opening or may comprise two or more openings through the spacer 60. The opening 69 communicates between the outer cavity 66 and the inner cavity 65 of the flow assembly 30.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the claims. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

The invention claimed is:

1. A filter assembly for a servo valve comprising:
a filter body defining a chamber;
a first end cap having a first fluid outlet at a first end of the filter body;
a second end cap having a second fluid outlet at a second end of the filter body;
a flow restrictor configured to restrict fluid flow between the filter body and each of the first and second fluid outlets; and
a spacer in the chamber spacing the first end cap from the second end cap, the spacer comprising a first head, a second head, and a shaft portion, wherein the first head, the second head, and the shaft portion are in the chamber defined by the filter body, the shaft portion extending between the first and second heads to space the first head from the second head, wherein the first head and the second head have a greater diameter than the shaft portion to space the filter body from the shaft portion.

2. The filter assembly of claim 1, wherein the spacer supports the filter body at the first and second ends of the filter body.

3. The filter assembly of claim 2, wherein the first end cap is received over the first end of the filter body and the second end cap is received over the second end of the filter body.

4. The filter assembly of claim 3, wherein the first end cap and the second end cap are press fitted on the filter body.

5. The filter assembly of claim 1, wherein the first end of the filter body is retained between the spacer and the first end cap, and the second end of the filter body is retained between the spacer and the second end cap.

6. The filter assembly of claim 1, wherein the spacer defines an inner cavity fluidly communicating with a fluid nozzle and comprises at least one fluid opening between an outer side of the spacer and the inner cavity.

7. The filter assembly of claim 1, wherein the flow restrictor comprises a first fluid nozzle fluidly communicating with the first fluid outlet, and a second fluid nozzle fluidly communicating with the second fluid outlet.

8. The filter assembly of claim 7, wherein the first end cap comprises the first fluid nozzle and the second end cap comprises the second fluid nozzle.

9. The filter assembly of claim 8, wherein the first fluid nozzle forms the first fluid outlet and the second fluid nozzle forms the second fluid outlet.

10. The filter assembly of claim 1, wherein the spacer forms the restrictor.

11. The filter assembly of claim 1, wherein at least a portion of the spacer is spaced from the filter body to define an outer cavity between an outer side of the spacer and the filter body.

12. The filter assembly of claim 1, wherein the spacer, first and second end caps, and the filter body are formed from materials having substantially the same coefficient of thermal expansion.

13. The filter assembly of claim 12, wherein the spacer, first and second end caps, and the filter body are formed from the same material.

14. The filter assembly of claim 1, wherein the filter body is a tubular filter body.

15. A servo valve comprising:
 the filter assembly of claim 1;
 a fluid supply;
 a first stage of the servo valve; and
 a second stage of the servo valve;
 wherein the filter assembly filters fluid from the fluid supply to the first stage of the servo valve.

16. The servo valve of claim 15, comprising a filter assembly chamber, wherein fluid from the fluid supply to the second stage of the servo valve flows in the filter assembly chamber, wherein the filter assembly is disposed in the filter assembly chamber.

17. A method of forming a filter assembly for a servo valve comprising:
 providing a filter body defining a chamber;
 disposing a spacer in the chamber;
 fitting a first end cap having a first fluid outlet at a first end of the filter body;
 fitting a second end cap having a second fluid outlet at a second end of the filter body; and
 spacing the first end cap from the second end cap with the spacer, wherein the spacer comprises a first head, a second head, and a shaft portion, wherein the first head, the second head and the shaft portion are in the chamber defined by the filter body, the shaft portion extending between the first and second heads to space the first head from the second head, the first head and the second head having a greater diameter than the shaft portion to space the filter body from the shaft portion.

\* \* \* \* \*